United States Patent [19]  
Anthony

[11] 4,070,221  
[45] Jan. 24, 1978

[54] MULTI-SEGMENTED SEALING RING

[75] Inventor: Andrew James Anthony, Tariffville, Conn.

[73] Assignee: Combustion Engineering, Inc., Windsor, Conn.

[21] Appl. No.: 728,667

[22] Filed: Oct. 1, 1976

[51] Int. Cl.² ............................................. B29C 19/00
[52] U.S. Cl. .................................... 156/245; 156/152; 156/304; 176/87; 264/259; 264/261; 277/192; 277/235 R
[58] Field of Search ................. 156/91, 152, 182, 245, 156/278, 280, 304, 309; 428/65, 223, 424; 52/745; 264/34, 35, 259, 261; 277/192, 235 R, 1, 198; 176/87; 220/13

[56] References Cited  
U.S. PATENT DOCUMENTS

| 3,201,136 | 8/1965 | Harrison et al. ..................... 277/198 |
| 3,633,784 | 1/1972 | Taft ........................................ 176/87 |
| 3,770,863 | 11/1973 | Elgenstierna ....................... 264/261 |

Primary Examiner—Charles E. Van Horn  
Assistant Examiner—J. J. Gallagher  
Attorney, Agent, or Firm—Joseph H. Born

[57] ABSTRACT

A method is disclosed for making a ring for sealing the opening between a reactor vessel and the wall of the cavity in which it sits. The method permits forming the sealing ring in segments at an off-site location, thereby eliminating the transportation problems encountered with an integral sealing ring. According to the method, seals and coatings can be applied to the individual segments before the segments are shipped, and the seals and coatings are completed when the sealing ring has been assembled at the site. This allows a segmented ring to be provided without high on-site fabrication costs.

6 Claims, 5 Drawing Figures

MULTI-SEGMENTED SEALING RING

BACKGROUND OF THE INVENTION

A nuclear-reactor vessel is typically set inside a cavity formed of structural and shielding material. During refueling, the reactor-vessel head is removed, and that part of the cavity that extends above the remaining section of the vessel is filled with borated water, which has the twin purposes of shielding personnel working on the refueling operation and essentially eliminating further reaction in the fuel assemblies being handled. For various reasons, including the desirability of ventilation of the cavity, an opening normally exists between the reactor-vessel flange and the cavity wall. Since the reactor-vessel flange and a shelf on the cavity wall both form part of the floor of a pool that is to contain the borated water, it is necessary to cover the opening between the flange and the cavity wall. The pool seal is the cover for this opening, and when the pool seal is in place, the borated water cannot flow through the opening.

The pool seal, which is typically a large integral ring made of stainless steel in order to avoid corrosion, is difficult to build because of its size and the fact that its entire sealing surface must be machined to make it smooth enough to provide effective sealing. The resulting structure is large and rigid and is consequently quite unforgiving of irregularities in the height of the surfaces upon which it is to rest. While an inflatable seal is normally positioned between those surfaces and the ring, machined surfaces must nonetheless be provided, because the inflatable seal does not easily conform to small irregularities in the sealing surfaces. Though the inflatable seal can conform to larger irregularities, the larger irregularities still cause problems. The ring itself is too rigid to conform to these irregularities, and this causes insufficient sealing pressure at the "valleys" of the sealing surfaces.

Perhaps the chief problem with the integral sealing ring is the fact that, due to its large size and weight, rather elaborate transportation means must be provided in order to move it from the factory to the site. This requirement usually necessitates that the sealing ring be transported at the same time as the reactor vessel so that the sealing ring can travel on the same transportation means as the reactor vessel. In addition to the added difficulty of transporting both the seal and the reactor vessel at the same time, scheduling problems result because the sealing ring must be finished before the reactor vessel can be sent. This, of course, reduces the ability of the factory to schedule its resources efficiently.

SUMMARY OF THE INVENTION

Accordingly, it is an object of the present invention to provide a method for constructing a pool seal from segments, thereby reducing transportation difficulties and coincidentally contributing to the ability of the resulting structure to conform to uneven surfaces.

According to the present invention, elastomeric sealing ridges are bonded to pool-seal segments at an off-site location, and those surfaces that are to be in contact with the borated water are coated with an elastomer in order to protect them from the adverse effects of such contact. The segments are then transported to the site, where they are assembled. More elastomer is bonded between sealing-ridge segments and between pool-seal segments, thereby forming radial seals between pool-seal segments and joining sealing-ridge segments into complete circles.

BRIEF DESCRIPTION OF THE DRAWINGS

These and further features and advantages of the invention become evident in the embodiment shown in the drawings attached, wherein.

DETAILED DESCRIPTION OF THE PREFERRED EMBODIMENT

Figure 1:
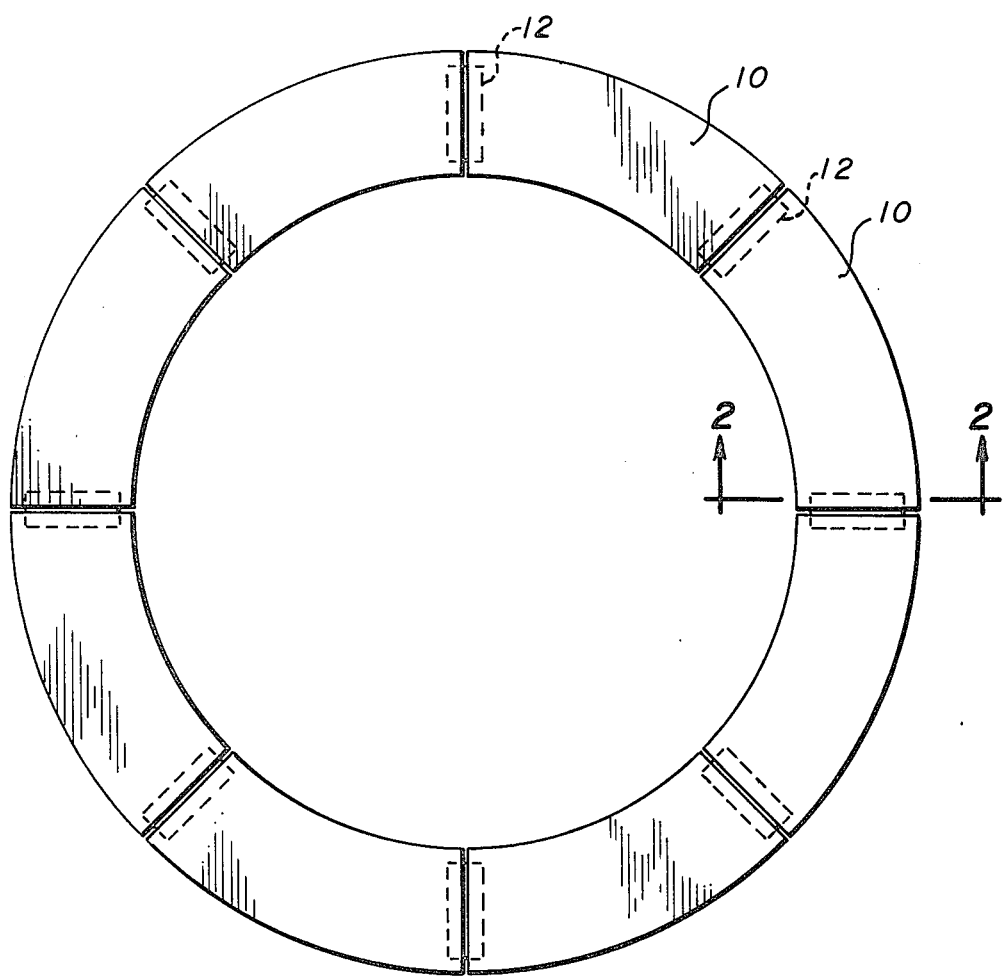
FIG. 1 is a plan view of an assembled ring according to the present invention.
Figure 2:
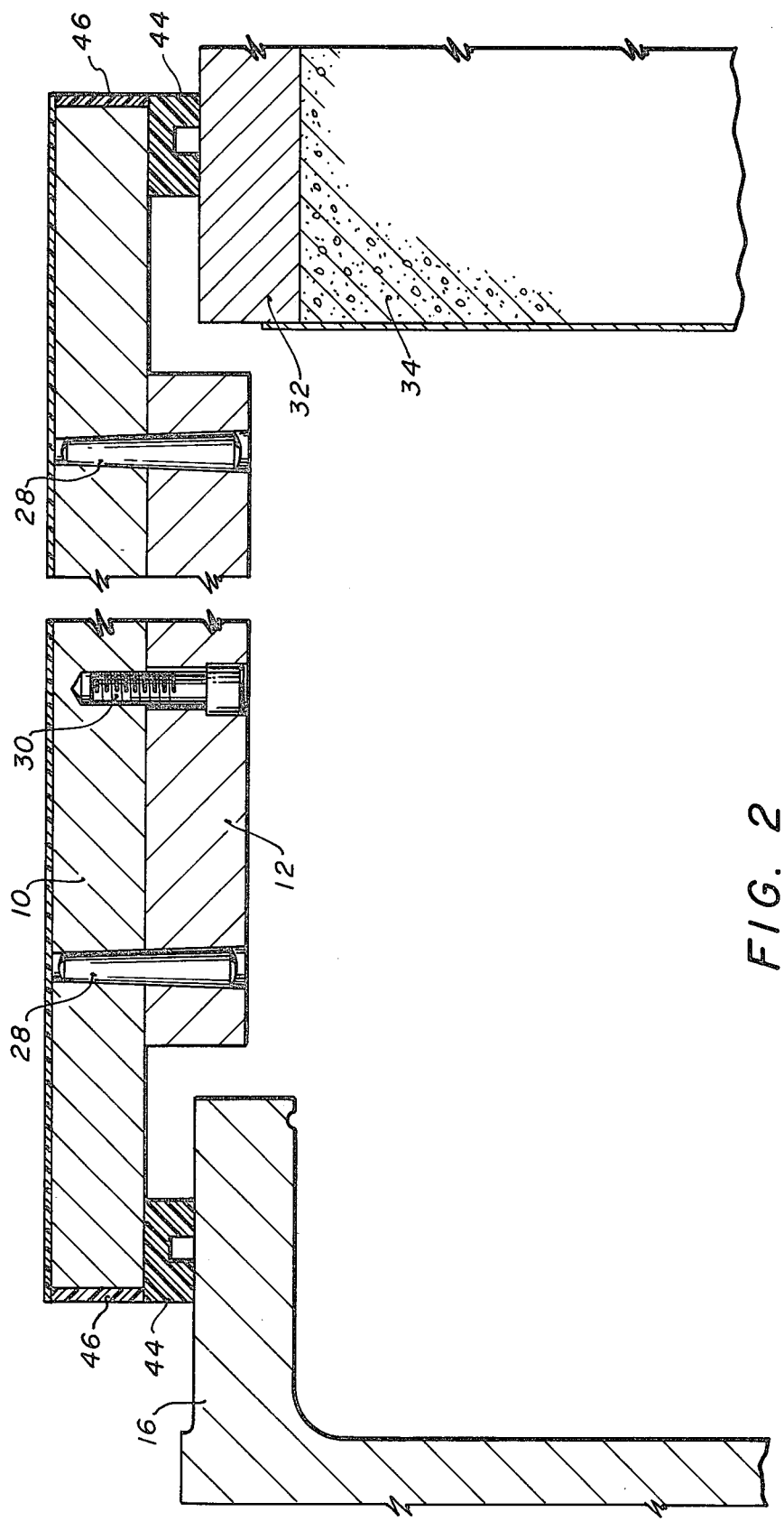
FIG. 2 is a cross section, taken at Line 2—2 of FIG. 1, that shows the position of a pool-seal segment in the cavity.

The typical pool seal is in the shape of a giant washer, as can be seen from FIG. 1. The difference between the pool seal of FIG. 1 and those currently being used is that the pool seal of FIG. 1 is made of eight segments connected by support plates 12. The purpose of the pool seal is to cover an annular opening between the reactor-vessel flange and a shelf formed in the wall of the cavity that contains the reactor vessel. The shelf acts as the floor of a pool that is filled with borated water during refueling; when the pool seal is set in place, no borated water can leak out of the pool through the annular opening. Support plates 12 are fastened to the bottom of the segment joints but are not long enough, as can be seen in FIG. 2, to interfere with the fit of segment 10 onto embedment ring 32 and reactor-vessel flange 16. Embedment ring 32 is an annular support set in the shelf formed by cavity wall 34.

In order to form the structure shown in FIG. 2, the individual segments are assembled at the off-site manufacturing location with the top surface down. Support plates 12 are bolted in place by screws such as screw 30 arrayed across the face of the support plate. Once the screws are in place, and the segments are therefore in their correct relative positions, tapered holes are drilled to receive tapered locating dowels 28, which are later used to relocate the segments during reassembly. The segments are then marked for reassembly and disassembled.

Figure 3:
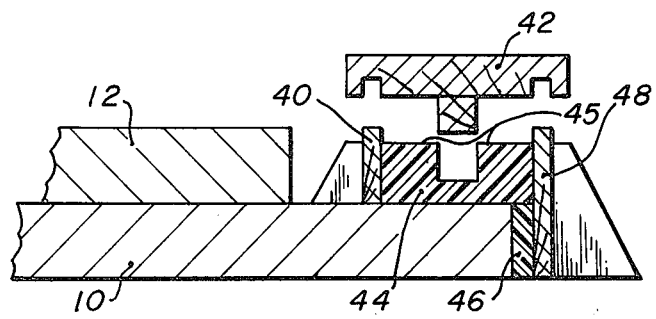
FIG. 3 is a cross-sectional view of a sealing ridge according to the present invention formed on a pool-seal segment.
Figure 4:
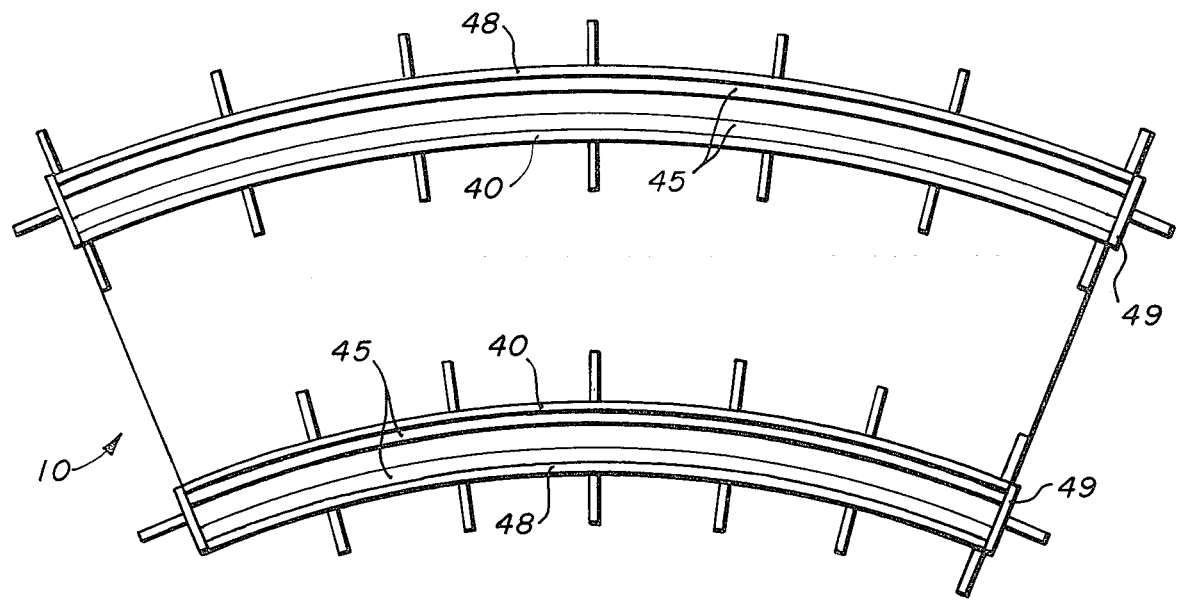
FIG. 4 is a plan view of a segment showing the sealing ridges being formed.

When the assembly has been disassembled, annular forms 48, shown in FIG. 3, and forms 49, shown in FIG. 4, are positioned around the outer edges of each segment 10. A material such as 60-durometer polyurethane, a liquid that cures to an elastomer, is poured into the resulting gaps, forming outer-edge coatings 46 that adheres to the carbon-steel segments. Another annular form 40, shown in FIG. 3, is placed on each segment 10, and more polyurethane is placed in the annular openings between forms 40 and 48. Before the polyurethane sets, forms 42 are placed atop forms 40 and 48, thereby causing sealing ridges 45 to be formed in the resulting polyurethane sealing strips 44. Each sealing strip 44 is in such a position as to have its ends in registration with the ends of strips 44 on adjacent ring segments when the ring segments are connected. After the polyurethane has cured, the forms are removed, and the segments are turned right side up. In a step not shown in the drawings, a polyurethane coat is applied to the top surface of the entire assembly. This coating, along with coatings 46, provides protection from the effects of the borated water, thus allowing the ring to be made of carbon steel.

Figure 5:
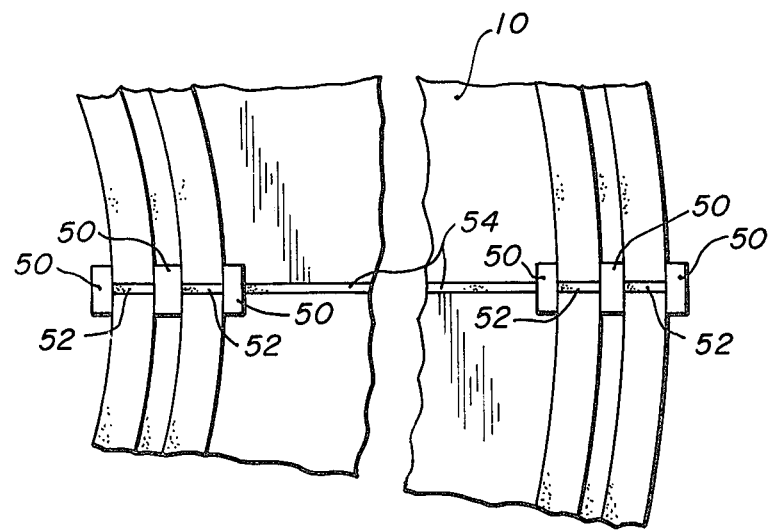
FIG. 5 is a plan view of a portion of an annular sealing ridge being formed after the segments have been reconnected.

The finished segments that result from this process are ready for shipping to the site. Because the sealing ring has been made in segments, it can be shipped by ordinary means, such as by truck on ordinary highways. Upon arrival at the site, the segments are reassembled upside down, pins 28 being used to ensure that the off-site assembly is repeated. Forms 50, shown in FIG. 5, are placed about the annular seal at the joints, and polyurethane is poured into the spaces 52 that appear between forms 50 at the joints. The poured polyurethane adheres to sealing ridges 45 thereby connecting them into completed circles.

The annular sealing strips 44 having been completed, it remains to fill the radial seams between the segments. In order to do this, the assembled ring is turned right side up. Radial seams 54, shown in FIG. 5, are then filled with polyurethane. This completes the sealing ring. When all the polyurethane has cured, the sealing ring is ready for use.

As has already been mentioned, the ring is used during reactor refueling. When it is desired to refuel the reactor, the ring is set into annular opening, and borated water is then poured in on top of it. After the refueling operation has taken place, the borated water is drained, and the ring is removed and decontaminated. In a typical application, a strippable coating might be applied on top of the polyurethane coating before the borated water is poured, thus allowing decontamination to be accomplished by merely stripping off the strippable coating. Such a coating might be a strippable polyethylene.

In addition to the advantages cited above concerning transportation of the pool seal, the pool seal of the present invention also has the advantage that it can be made from carbon steel, because a coating has been provided that protects the carbon steel from the effects of the borated water. Another advantage is that the sealing surfaces are made of an elastomeric material such as polyurethane, which can conform to irregularities in core-barrel flange 16 and embedment ring 32. Furthermore, since the ring is made of segments, it is not as rigid as an integral ring, and this allows the ring to be more forgiving of level variations around the flange or embedment ring.

While the invention has been described in conjunction with a specific embodiment, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A method of making a sealing ring to be used to cover an opening between a reactor-vessel flange and a cavity wall in a nuclear reactor system, the sealing ring to be supported by supporting surfaces on the reactor-vessel flange and the cavity wall, comprising the steps of:
   a. bonding elastomeric seal segments, having ends, to each of a plurality of ring segments that form a structure when connected of such shape as to cover the opening, the seal segments extending substantially the full length of the ring segments and being bonded in such positions on the ring segments as to engage the supporting surfaces when the structure is set in place and to bring each seal-segment end into registration with an end of a seal segment bonded to an adjacent ring segment when the ring segments are connected;
   b. connecting the ring segments, thereby forming joints between adjacent ring segments and between adjacent seal segments; and
   c. bonding an elastomeric seal into the ring-segment joint and into the seal-segment joints, thereby forming a continuous ring and continuous seals.

2. A method as recited in claim 1 further comprising the steps of:
   a. covering the upper and side surfaces with a substance for protecting the segments, thereby forming coating segments, the step of connecting the segments thereby including forming joints between the coating segments; and
   b. bonding seals into the coating-segment joints, thereby forming a continuous coating.

3. A method as recited in claim 2 wherein the step of bonding an elastomeric seal segment to the ring segments comprises bonding seal segments made of polyurethane to the ring segments.

4. The method of claim 3 wherein the step of bonding polyurethane segments to the ring segments comprises putting polyurethane into forms located on the ring segments and adapted to forming the seal segments and further comprise allowing the polyurethane to cure.

5. The method of claim 4 wherein the step of attaching an elastomeric seal to each of a plurality of ring segments comprises bonding the seal to ring segments made of carbon steel.

6. A method as recited in claim 5 wherein the step of covering the upper and side surfaces with a coating comprises covering the upper and side surfaces with polyurethane.

* * * * *